United States Patent [19]

Cafarelli

[11] 4,450,133

[45] May 22, 1984

[54] STABILIZATION OF MOLDED PARTS

[76] Inventor: Ralph J. Cafarelli, 228 Stone St., Clinton, Mass. 01510

[21] Appl. No.: 201,778

[22] Filed: Oct. 29, 1980

Related U.S. Application Data

[63] Continuation-in-part of Ser. No. 097,495, Nov. 26, 1979, Pat. No. 4,246,917.

[51] Int. Cl.³ .............................................. B29C 7/00
[52] U.S. Cl. .................................. 264/336; 264/237; 264/348
[58] Field of Search ................. 425/445, DIG. 9; 264/348, 336, 237; 134/124, 133, 134, 126, 105

[56] References Cited

U.S. PATENT DOCUMENTS

| 875,635 | 12/1907 | Thompson | 134/124 |
|---|---|---|---|
| 1,754,612 | 4/1930 | Cook | 134/134 |
| 2,183,602 | 12/1939 | Wiley | 264/237 |
| 2,385,860 | 10/1945 | Jesson | 134/124 |
| 2,538,242 | 1/1951 | Hannon | 134/75 |
| 2,618,284 | 11/1952 | Purnell | 134/133 |
| 3,164,656 | 1/1965 | Ipsen | 134/133 |
| 3,553,303 | 1/1971 | Zamasnik | 264/237 |
| 3,673,289 | 6/1972 | Gagliani | 264/348 |
| 4,165,354 | 8/1979 | Iida | 264/237 |

FOREIGN PATENT DOCUMENTS 2417847 10/1974 Fed. Rep. of Germany ...... 264/237

Primary Examiner—James H. Derrington
Attorney, Agent, or Firm—George E. Kersey

[57] ABSTRACT

Method for the stabilization of molded parts. Stabilization is achieved for parts ejected from a molding machine, by immersing the parts in a fluid medium during the course of their conveyance from a molding site. The result is thermal and/or fluid modification which gives stability to the parts, allowing them to be controllably conveyed away for further processing. This can permit early ejection of parts from the molding machine and enhance production capacity.

8 Claims, 9 Drawing Figures

STABILIZATION OF MOLDED PARTS

This application is a continuation-in-part of Ser. No. 097,495 filed Nov. 26, 1979, now U.S. Pat. No. 4,246,917.

BACKGROUND OF THE INVENTION

The invention relates to the stabilization of molded parts, by thermal or fluid modification, and, more particularly, to the high speed stabilization of such parts to enhance production capacity.

In the production of molded parts, molten material is forced into the cavity of a mold through openings called sprues and channels called runners. When the mold is opened, the desired or production product is expelled, along with a by-product formed in the sprue and runner channels. The latter is waste material which must be segregated from the production parts. This can be done manually but that is time consuming and inefficient.

Since the parts, both production and by-product, are produced from molten material, they initially are in an elevated temperature condition.

If the parts are expelled immediately, their dimensions and configurations can change significantly during cooling. When attempts are made to accelerate the cooling, the result often is shrinkage of the parts and loss of dimensional stability. In one attempt to achieve dimensional stability, i.e. reduce the changes that take place in the dimensions of the molded parts during cooling, the parts are allowed to cool partially in the mold before being expelled. The presence of the mold helps constrain the parts during cooling, but this procedure has the disadvantage that the increased residence time of the parts in the mold can seriously reduce the speed with which the parts are produced. In addition, since the parts are not completely cooled before expulsion, they are still subject to dimensional and configurational changes during subsequent cooling.

Even where dimensional and configurational stability are not significant considerations, prompt expulsion of parts from the mold requires that they be allowed to cool on an appropriate surface before they are subjected to further processing. This interferes with the molding operation and the rapid and efficient production of parts. There is either a production delay or a long conveyor must be used so that the parts will cool sufficiently before the next step in processing. Another technique has been to use a short conveyor with cooling fans but this technique has proved inadequate because it has been incapable of imparting sufficiently uniform cooling to the expelled parts.

Moreover, some molded materials require not only stabilization, but also conditioning. An example is nylon which can be too brittle for further processing unless its moisture content is at the right level.

Accordingly, it is an object of the invention to facilitate the production of molded parts. A related object is to facilitate the conditioning and stabilization of molded parts, particularly at high production rates. Another related object is to facilitate the handling of parts expelled from a mold in a relatively uniform and consistent manner.

Another object of the invention is to facilitate the cooling of molded parts, particularly at high production rates. A related object is to eliminate the shrinkage of parts and the need for in-mold cooling and its attendant reduction in the number of useful parts that can be produced in a given period of time. Another related object is to stabilize molded parts beyond the level attainable with in-mold cooling.

A further object of the invention is to eliminate the use of long conveyors in attempting to achieve high-speed stabilization of molded parts. A related object is to achieve stabilization beyond that achievable using long cooling conveyors.

A still further object of the invention is to eliminate the use of cooling fans with conveyors in attempting to achieve high-speed stabilization of molded parts. A related object is to achieve stabilization beyond that achievable with fan cooled conveyors.

Still another object of the invention is to achieve suitable segregation of production and by-product parts in a relatively rapid molding cycle. A related object is to permit the handling of parts expelled from a mold at a high mold operation rate.

SUMMARY OF THE INVENTION

In accomplishing the foregoing and related objects, the invention provides for the high-speed stabilization of molded parts by prematurely expelling them from a mold and subjecting them to a controlled change in surface temperature to produce molecular solidification or conditioning during conveyance of the parts from a molding site. This tends to fix or stabilize the outer configuration of the parts, so that they do not change significantly in shape during subsequent processing. The parts are then subjected to relatively uniform cooling during conveyance to a site for separation of production from by-product parts. This is to be contrasted from "quenching" which is the rapid cooling of metal from an elevated temperature by using a suitable quenching medium to increase hardness.

In accordance with one aspect of the invention the temperature change is achieved on a comparatively uniform basis from the high level associated with the expulsion of parts from a mold by expelling the parts into a fluid bath onto a conveyor which agitates the bath in the vicinity of a temperature control unit to promote an isothermal temperature distribution in the bath that produces skin-effect rigidity of the parts.

In accordance with another aspect of the invention, the bath is agitated by paddles on the conveyor belt, and the temperature control unit is a coil that is desirably positioned in the bath below the conveyor. The coil is desirably of serpentine construction. Temperature control fins may be employed with the coil.

In accordance with yet a further aspect of the invention, the entry of the expelled parts into the bath is promoted, even where the parts have a specific gravity which is similar or lower than that of the bath. This is accomplished by treatment of the bath, mechanically and/or chemically. The mechanical treatment causes agitation of the bath, for example, by movement of cleats in the bath which eliminates isothermal layers. The chemical treatment can make use of a diluent to facilitate the wetting of the parts and their entry into the bath. The residence of the parts in the bath can be used also to bring about the desired conditioning of their materials.

In accordance with still a further aspect of the invention, agitation of the bath also can be produced by a bubbling gas through the bath, or by auxiliary mechanical agitation above or in the bath. The effect of agitation is also achievable by the use of a wetting agent which reduces the buoyancy of the parts.

In accordance with other aspects of the invention, the bath includes hold-down rails to maintain a desired portion of the conveyor in the bath in accordance with the desired residence time. In addition an auxiliary conveyor may be positioned above the bath conveyor to further control the movement of parts in the bath.

DESCRIPTION OF THE DRAWINGS

Other aspects of the invention will become apparent after considering several illustrative embodiments taken in conjunction with the drawings in which.

DETAILED DESCRIPTION

Figure 1:
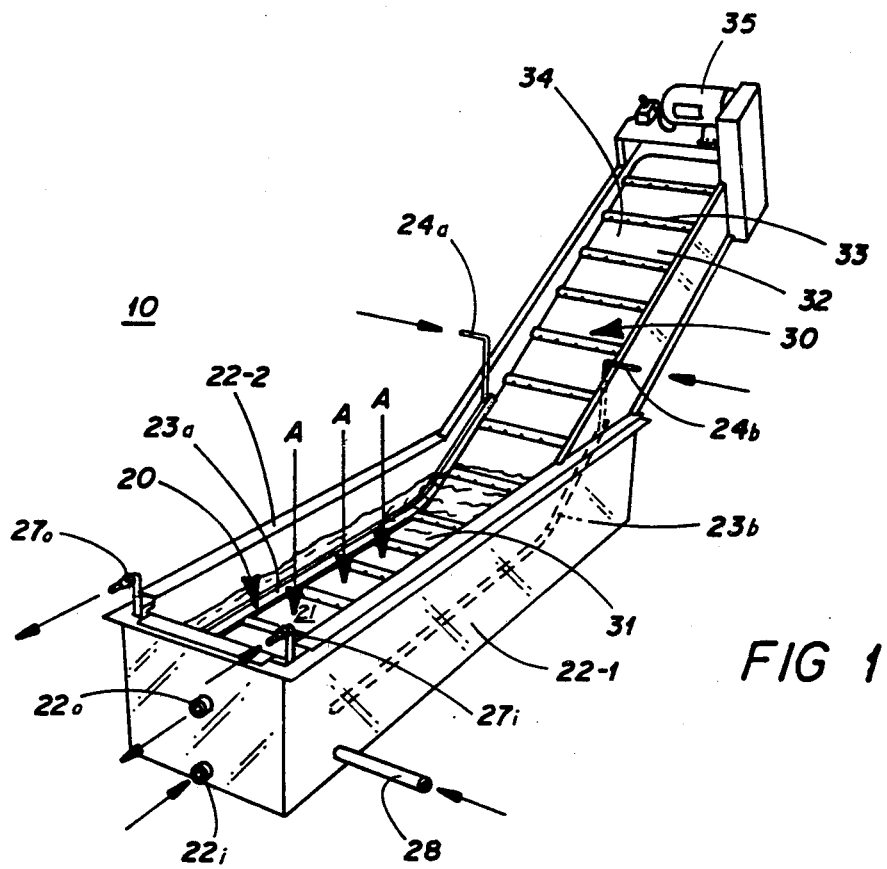
FIG. 1 is a perspective view of a partial system in accordance with the invention.

With reference to the drawings, a system 10 in accordance with the invention is shown in FIG. 1 with a temperature control unit 20 and a specially configured conveyor 30. The latter is in two portions 31 and 32 with the lower portion 31 generally within the unit 20 and the upper portion 32 extending outwardly from the unit 20 at a suitable angle to allow the conveyance of parts stabilized in the unit 20 for further processing, such as the separation of paroduction and by-product parts.

The parts that enter the unit 20 are deposited in the direction of the arrows A and typically represent production and by-product parts that have been expelled from a molding machine (not shown) positioned above the unit 20. When the mold of such a machine is opened, the parts are expelled and fall by gravity into the unit 20. It will be appreciated that parts may enter the unit 20 in a wide variety of other ways, such as with a chute or take-out conveyor.

The unit 20 of FIG. 1 illustratively includes a temperature controlled fluid medium 21 in a two-part tank 22-1 and 22-2. A suitable temperature controlled medium 21 is water which can be fed into the tank 22 at an inlet 22i or 22o. It will be appreciated that other temperature controlled media may be employed as well, and that they can be applied to the unit 20 in a wide variety of ways.

A tank with separate parts 22-1 and 22-2 is employed in order to prevent leakage at the bearins of the conveyor 30 and to facilitate maintenance of the conveyor. The tank can be of one piece construction as well. Ordinarily the shafts associated with the conveyor 30 would extend through the side walls of the tank. This could produce leakage from the tank at the mountings. The invention eliminates this possibility by using two tanks, an outer tank 22-1 and an inner tank 22-2 which is set into the outer tank 22-1. Any leakage from the inner tank 22-2 simply combines with that portion of the medium 21 in the outer tank 22-1.

Since the lower portion 31 of the conveyor is immersed in the medium 21, hold-down rails 23a and 23b, are affixed to respective side wall of the inner tank 22-2 to control the extent of the conveyor portion 31 in the medium 21.

Figure 3:
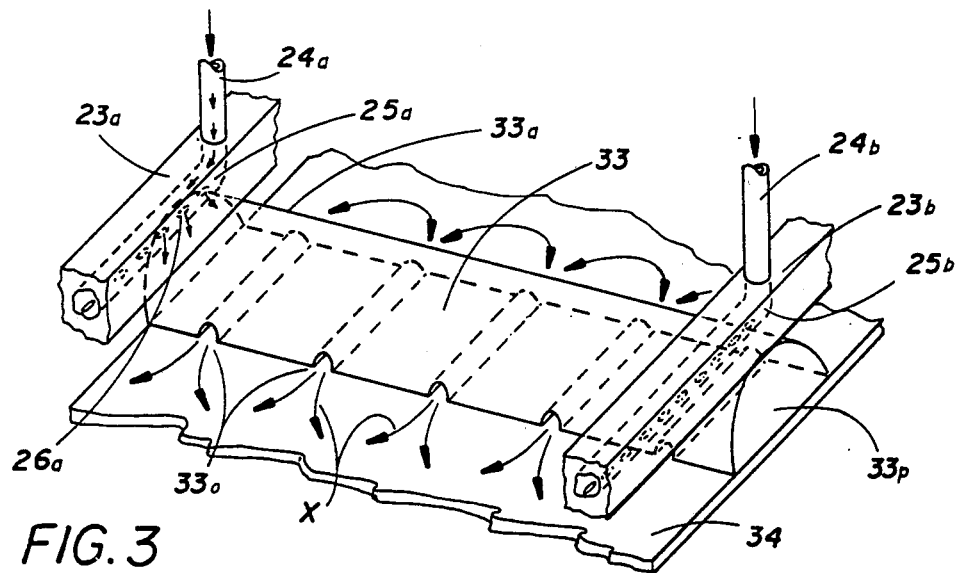
FIG. 3 is a perspective view showing details of the hold-down and cleat arrangement for the system of FIGS. 1 and 2.

In addition, the cleats 33, one of which is shown in detail in FIG. 3, are configured to facilitate the movement of the conveyor with respect to the hold-down rails 23a and 23b. For that purpose the cleats 33 have a surface which desirably maintains tangential contact with the lower surfaces of the rails 23a and 23b. As shown in FIG. 3 a suitable cross sectional profile of the cleat 33 is provided by a parabola 33p.

Also, provision is advantageously made to promote the movement of the cleats with respect to the rails 23a and 23b over that region which is not immersed in the medium 21. This is the region between the ends of the rails 23a and 23b of the inclined portion of the conveyor 23 and the exit of the conveyor from the unit 20. The use of polyethylene, nylon or acetal cleats provides a lubricious bearing surface so that additional lubricants generally are not needed. Where additional lubrication is desired, it is provided by lines 24a and 24b which apply a suitable material to the respective rails 23a and 23b. For that purpose lines 24a and 24b are connected to internal channels 25a and 25b which have outlet apertures 26a and 26b at the contact points of the cleats 33 as shown in FIG. 3.

It is desirable for the material applied at the lines 24a and 24b not only to provide lubrication but also serve as a wetting agent for the medium in the unit 20. The wetting agent is desirable to facilitate the immersion of buoyant parts into the bath. A suitable lubricating and wetting agent is a non-ionic surface active substance, for example, a nonyl phenol ethylene oxide adduct. One such adduct is sold and marketed under the name "IGEPAL" CO-800 by G.A.F. (General Aniline and Film Co.). It will be appreciated that the medium 21, e.g. water, may be applied to the tanks 22-1 and 22-2 by the lines 24a and 24b.

In addition, movement of the cleats 33 relative to the hold-down rails 23a and 23b is promoted by the use of suitable plastic materials such as solid linear polyethylene, nylon or acetal. The belt 34 shown in FIG. 3, is advantageously of low shrink polyvinylcloride or stainless steel mesh which is substantially unaffected by its immersion in the unit 20.

Figure 2:
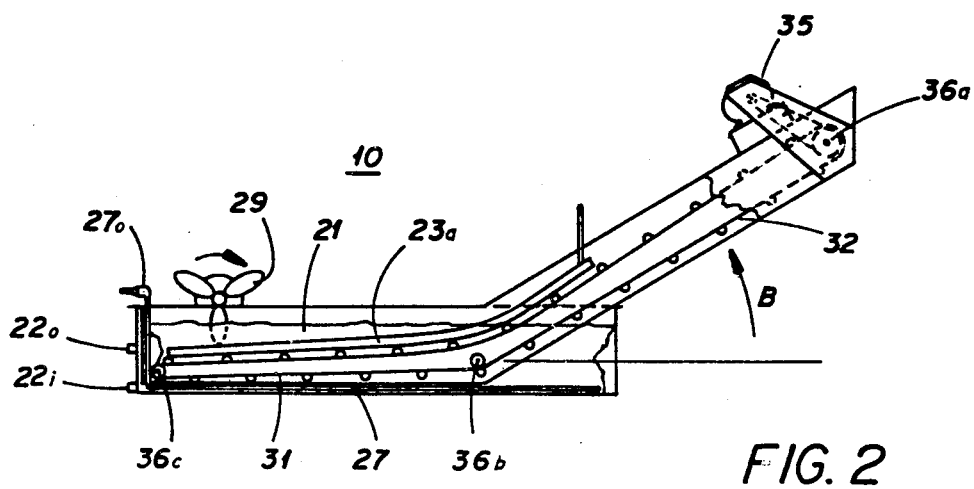
FIG. 2 is a cross sectional view showing conveyor details of the system of FIG. 1.

The system 10 is operated by a drive motor 35 positioned above the discharge end of the inclined conveyor portion 32 as shown in detail in FIG. 2. The motor 35 operates a drive roll 36a of the conveyor, which is also provided with an idling roll 36b and an end roll 36c. As noted previously the idling roll 36b and the end roll 36c are mounted in the walls of the inner tank 22-2 to prevent leakage of the medium 21. The drive roll 36a is desirably of hollow construction to permit drainage of any fluid carried out of the bath to the upper portion of the conveyor. The idler roll 36b is positioned within the tank 22 at a break point between transitions from the inclined portion of the conveyor 35 to the straight line portion of the conveyor 31. The illustrated angle of inclination of the portion of the conveyor extending out of the bath is illustratively 30 degrees as indicated by the arc B in FIG. 2. Acceptable ranges of elevation for the inclined portion of the conveyor 30 desirably range between 5 degrees and 65 degrees.

Figure 4:
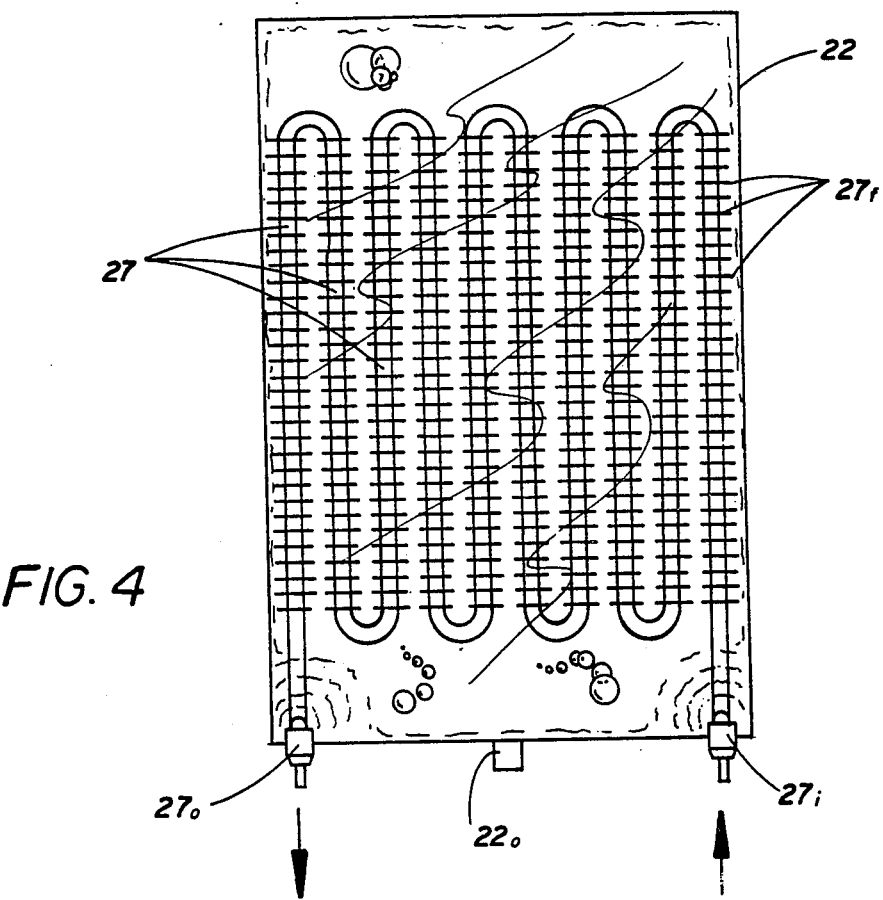
FIG. 4 is a plan view of the bath portion of the system of FIGS. 1 and 2 showing a cooling arrangement for maintaining a relatively uniform temperature in the cooling bath.

As the parts ejected from the mold into the unit 20 enter the medium 21, they transfer their heat to the body mass of the medium. In general operation, after a relatively small number of cycles, the temperature of the medium 21 would soon approach that of the parts. In order to facilitate the maintaining of the temperature of the medium 21 at a suitable level, the base of the tank 22 includes a serpentine temperature control coil 27 shown in plan view in FIG. 4. A suitable substance, for example, a refrigerant, such as ethylene glycol, is applied at an inlet 27i, at an extension of the coil 27 above the tank 22, as shown in FIGS. 1 and 2. The refrigerant exits from the coil 27 at an outlet 27o which is also above the level of the tank 22. Suitable transfer of heat to the coil 27 is promoted by the use of fins 27f on the coil 27. It will be appreciated that in some cases, the objective will include maintaining the parts relatively warm, in which case a substance such as steam or hot water is used to maintain a desired temperature, e.g. 75° F. In the case of moisture stabilization of nylon, a temperature of 200° F. is maintained.

In addition to the use of the coil 27, the maintenance of the bath at a desired temperature level can be promoted by controlling the flow that enters the inlet 22i and leaves the outlet 22o, as indicated in FIG. 1. A pump (not shown) forces the bath fluid into the inlet 22i and the outflow leaves by the outlet 22o. It is desirable to use filters (not shown) in the pump line. Since the transfer of heat causes warm layers of water to be at the top of the tank, the outlet 22o is located near the upper level of the bath while the filling inlet 22i is located near the base of the tank. The inlet and outlet are advantageously at opposite ends of the tank to promote proper mixing. It is to be noted that when the medium 21 is to be drained from the tank 22, the pump (not shown) at the inlet 22i is disconnected and drainage is allowed to take place at that point.

As the parts that have fallen into the bath and settled on that portion of the conveyor 31 in the tank 22 are carried out of the unit 20, coolant tends to be trapped behind the leading portion of each cleat, e.g., the portion 33a of FIG. 3. The bath coolant that would otherwise be trapped is released by the provision of apertures 33o at the base of the cleat and above the surface of the carrier 34. The flow of the rleased coolant is indicated by the arrows X.

Figure 5:
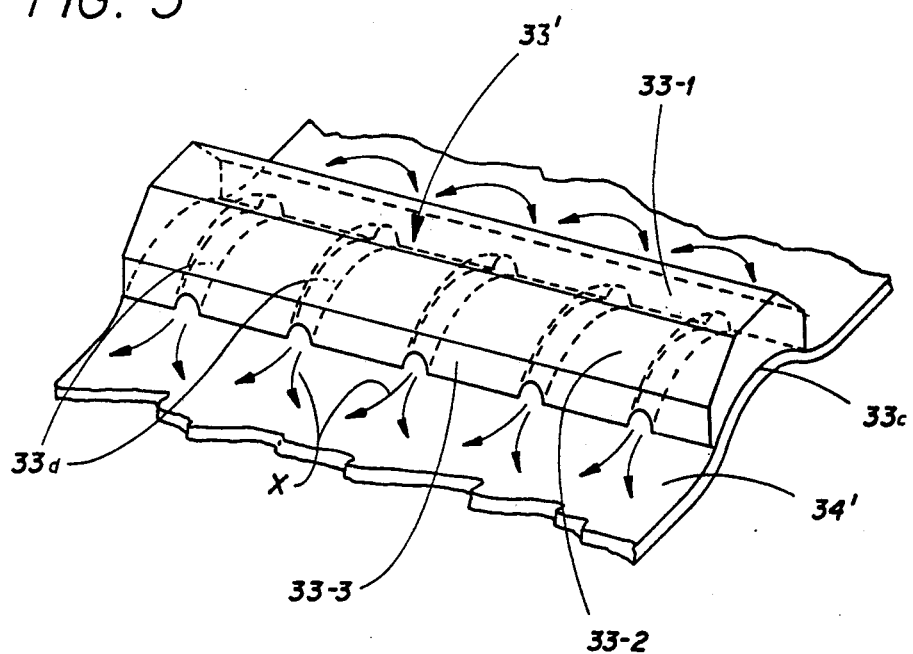
FIG. 5 is perspective view of an alternative cleat and support mounting according to the invention.

An alternative form of cleat 33' is shown in FIG. 5. This cleat has a profile formed by straight line segments, with the segment facing the hold-down rails 23a and 23b being flat. Because the exterior surface of the cleat 33' has straight-line segments, it is easily produced. In addition the cleat 33' has a curved base 33c. This limits the tendency of the base to separate from the carrier as the conveyor changes direction, and thus avoids the inadvertent trapping of parts between the base and the carrier.

The entry of bouyant parts, as well as the immersion conditioning and processing of parts is facilitated by other techniques, such as the introduction of a gas at inlet 28 (FIG. 1) which bubbles through unit 20 and produces the desired agitation. Supplemental agitation can be produced by the propeller 29, shown in FIG. 2. Rotation of the propeller 29 also facilitates entry of the parts into the bath. In some cases the agitation produced by the cleats of the conveyor is sufficient to prevent the formation of laminar layers at different temperatures in the bath.

Figure 6:
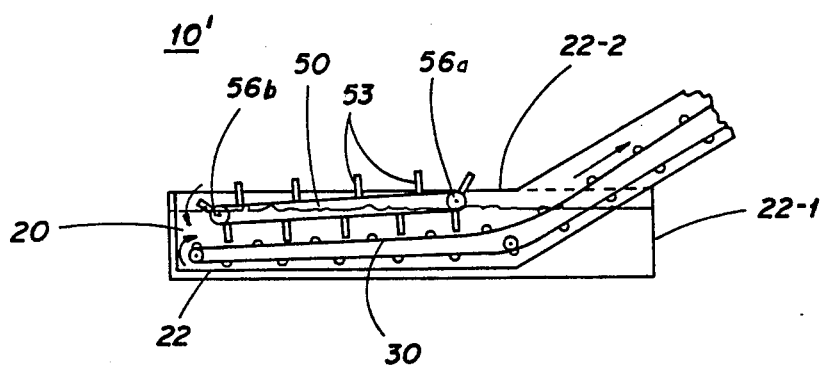
FIG. 6 is a partial side view of an alternative system in accordance with the invention.

Another technique for promoting the immersion of parts is shown in FIG. 6. An auxiliary conveyor 50 with paddles 53 is positioned above the lower portion 31 of the conveyor 30. The conveyor is mounted on rollers 56a and 56b, which are also mounted in the inner tank 22-2 to prevent leakage of any contained fluid. The current produced by the rotation of the conveyors 30 and 50 carries the parts between them to bring about the desired processing.

Figure 7B:
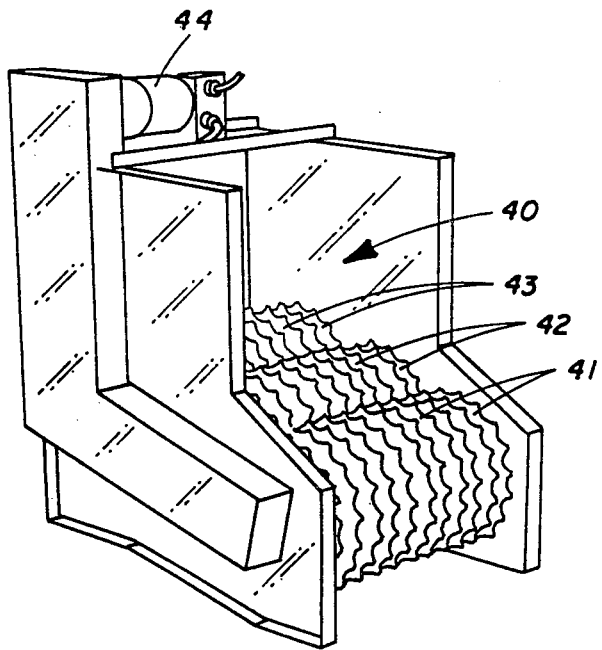
FIG. 7B is a perspective view of the separator shown in FIG. 7A.
Figure 7A:
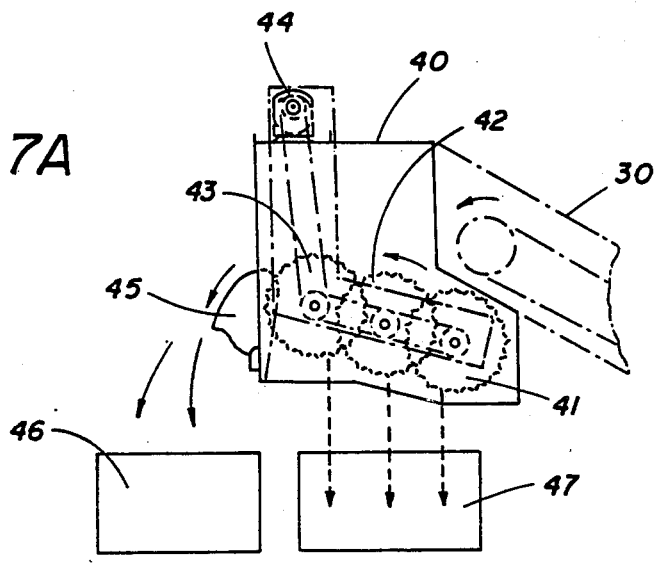
FIG. 7A is a partial side sectional view showing a separator used in the system of FIGS. 1 and 2.

The parts that are carried to the exit position of the conveyor typically include both production and by-product parts. Production parts represent the desired output of the system and are collected and packaged accordingly. The by-product parts are scrap. They are collected for reuse in the molding cycle by granulation, and remelting and injection into the mold. In order to effect the desired separation of the production and by-product parts the invention provides for connection with a separator 40 at the output end of the conveyor 30 as shown in FIG. 7A. Details of the separator are set forth in FIG. 7B.

The separator 40 automatically separates production parts from by-product parts, such as runners, at the discharge end of the conveyor. It is advantageously bolted to the frame of the conveyor 30. The separator 40 contains three sets of intermeshed rotors 41, 42 and 43 which have their hubs mounted at an angle of elevation which is slightly less than the angle of elevation of the inclined portion of the conveyor 30. The rotors 41, 42 and 43 are driven by a motor 44 which directly turns the rotors 43, which in turn drives rotors 41 and 41. The parts of one group fall between the rotors and are collected in a bin 47. The parts of the other group are carried over the tops of the rotors to diverter blades 45 where they are dropped into a bin 46. In the usual case it is the production or scrap parts that are carried over the rotors and are collected in the bin 46. However, inverse separation is also possible in which it is the by-product parts that are dropped thru the rotors and collected in the bin 47.

Figure 8:
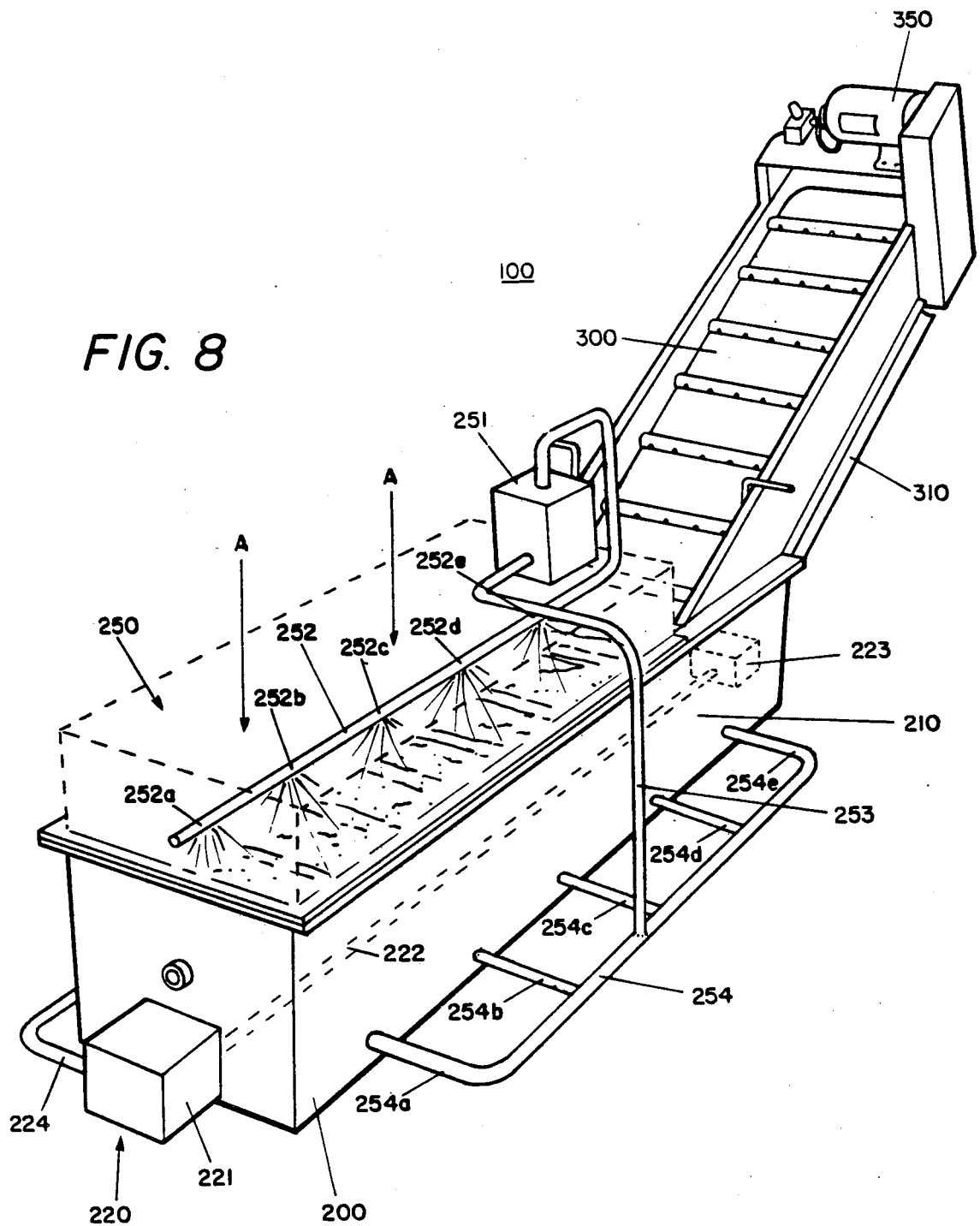
FIG. 8 is a perspective view of an alternative system in accordance with the invention.

A further embodiment of the invention is shown in FIG. 8, which is particularly useful in the conditioning of polypropylene and polyethylene parts which have a density less than that of water (1.0). Where the treatment bath is a fluid having a density less water, it may be sufficiently low that supplemental immersion techniques are not required. In the general case with low density plastic parts it has been found desirable to use the embodiment 100 of FIG. 8 in which a temperature control unit 200 is employed with a manifold 250.

The manifold 250 can take a variety of forms. It typically includes access regions for the entry of parts into the bath 210 in the direction indicated by the arrows A. It will be appareciated that the parts or other objects which are to be conditioned can enter the unit 200 in a wide variety of other ways, for example with a chute or take-out conveyor.

In the particular system 100 of FIG. 8, the manifold 250 is formed by a pump and processing unit 251 which feeds a temperature conditioning fluid along an outlet duct 252. The duct 252 includes nozzle heads 252a, 252b, 252c, 252d and 252e at preassigned intervals along the length of the duct. In the particular embodiment of FIG. 8 the nozzles are regularly spaced. It will be appreciated that variable spacing as well as various size nozzles may be employed in accordance with the conditioning requirements. Each of the nozzles 252a through 252e provides a "solid cone" spray that continously impinges upon the surface of the bath 210. The conical spray of the nozzles is adjusted so that the cone of effluent of each preceeding spray is merged with a portion of the cone of each succeeding spray. In this way entire coverage is provided for the bath. Consequently when parts are dropped into the bath, for example along the path indicated by the arrows A. The spray assures complete wetting and the desired isothermal environment.

In the system 100 of FIG. 8 control over the temperature of the bath 210 is in part exercised by a heat exchanger arrangement 220 which includes an input unit 221, a throughput unit 222 in the bath 210, an output unit 223 and a return line from the output to the input 224. The exchanger 220, which can be implemented in a variety of ways, assures that the temperature control fluid or gas which enters at the input 221 is at the proper temperature. The desired isothermal effect throughout the bath is assured by the action of the conveyor 300 in the bath 210 and the additional turbulence in the bath 210 caused by the solid cone sprays. The fluid from the bath that is discharged by the spray head 252 returns to the pump 251 from a manifold 254 by a return line 253. The manifold includes individual feed pipes 254a through 254e in the base of the unit 200 roughly underlying respective nozzles 252a through 252e. This arrangement helps assure that the fluid that is to be discharged at the spray head 252 is at about the desired temperature for the conditioning of the objects which enter the tank 200. Supplemental temperature control may also be included in the pump 251 to either elevate or lower the temperature as desired.

In other applications of the invention the manifold 250 takes the form of a drip weir or other unit by which the entry or recycling of fluid into the tank 200 is regulated. Provision may also be made to control the level of the bath by an auxiliary system (not shown) that either supplements the level of the bath or reduces it according to the processing conditions.

In addition, the conveyor 300 is controlled by a stepping motor 350 which operates either continuously or in specified increments. For example in cases where the molding cycle of the machine used with the unit 100 is variable, the motor 350 can be varied in a like manner. In cases where the parts enter the bath at a certain region of the belt, the conditioning time can be lenghtened or decreased by the control of the stepping motor. Alternatively, the motor 350 can be operated continuously with an electric clutch that is programmed for desired starting and stopping.

In the embodiment of FIG. 8 a representative belt speed is about two feet per minute and the parts that enter the bath typically remain for about two minutes. A typical molding cycle of the machines used with the system 100 is about seven to sixty seconds. The invention permits a lowering of the cycle time and a consequent increase in production. The temperature ranges of the bath used with the invention range from very cold, for example, 35° F., to the maximum temperature of the bath, for example, boiling. In some cases it is desirable to stabilize the parts in the bath by maintaining the temperature in the bath above 200° F. In the typical case the parts that are expelled into the bath have a temperature in the range from 100° to 200° F. and the invention is used both for the stabilization of the parts, and the control of the temperature associated with the conditioning.

While various aspects of the invention have been set forth by the drawings and specification, it is to be understood that the foregoing detailed description is for illustration only and that various changes in the parts, as well as the substitution of equivalent constituents for those shown and described may be made without departing from the spirit and scope of the invention as set forth in the appended claims.

What is claimed is:

1. A method for stabilizing molded plastic parts comprising the steps of
   (a) preparing a bath having a isothermal temperature distribution therein;
   (b) expelling plastic parts from a mold into said bath to subject the exterior surfaces of the expelled parts to a differential temperature change that produces skin effect rigidity and;
   wherein a chemical diluent is added to said bath to facilitate the wetting of said plastic parts and their entry into said bath.

2. The method of claim 1 wherein said parts are moved through said bath by a first conveyor and an isothermal temperature distribution throughout said bath is promoted by the use of agitating paddles on a second conveyor.

3. The method of claim 2 wherein the paddles of said second conveyor move above a temperature control coil in said bath.

4. The method of claim 2 wherein said bath is agitated in the direction of movement of said second conveyor.

5. The method of claim 2 wherein said first conveyor is maintained in said bath by hold-down rails which engage cleats on said first conveyor.

6. The method of claim 5 wherein said cleats contain slots to facilitate the draining of fluid lifted out of said bath.

7. The method of claim 5 wherein the agitating paddles of said second conveyor are interspersed with the cleats on said first conveyor.

8. The method of claim 1 wherein said temperature control coil has a serpentine configuration that extends over substantially the entire base of said bath.

* * * * *